Jan. 21, 1936.  H. D. PHILLIPS  2,028,520

STRAINER

Filed Jan. 29, 1935

Inventor
H. D. Phillips
By Watson E. Coleman
Attorney

Patented Jan. 21, 1936

2,028,520

UNITED STATES PATENT OFFICE 2,028,520

STRAINER

Howard D. Phillips, Vancouver, Wash.

Application January 29, 1935, Serial No. 3,960

4 Claims. (Cl. 210—165)

This invention relates to the class of liquid purification and pertains particularly to improvements in strainers.

The primary object of the present invention is to provide a liquid strainer which is so designed that the effective rapid removal of solid particles from liquids may be obtained without creating eddy currents in the strainer which would tend to interfere with the smooth passage of the liquid therethrough.

A further object of the invention is to provide a strainer which may be employed for straining aqueous or oily liquids and which, if used for oily liquids, will effectively remove water as well as solid particles therefrom by sedimentation.

A still further object of the invention is to provide a strainer which is constructed in a novel manner to permit the passage of liquids therethrough with a minimum of resistance so that the strainer will not materially retard the rate of flow of a fluid in a pipe line in which it is placed.

Still another object of the invention is to provide a strainer in which the several parts are assembled in a novel manner permitting quick and easy removal of the parts and easy cleaning of the strainer.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1:
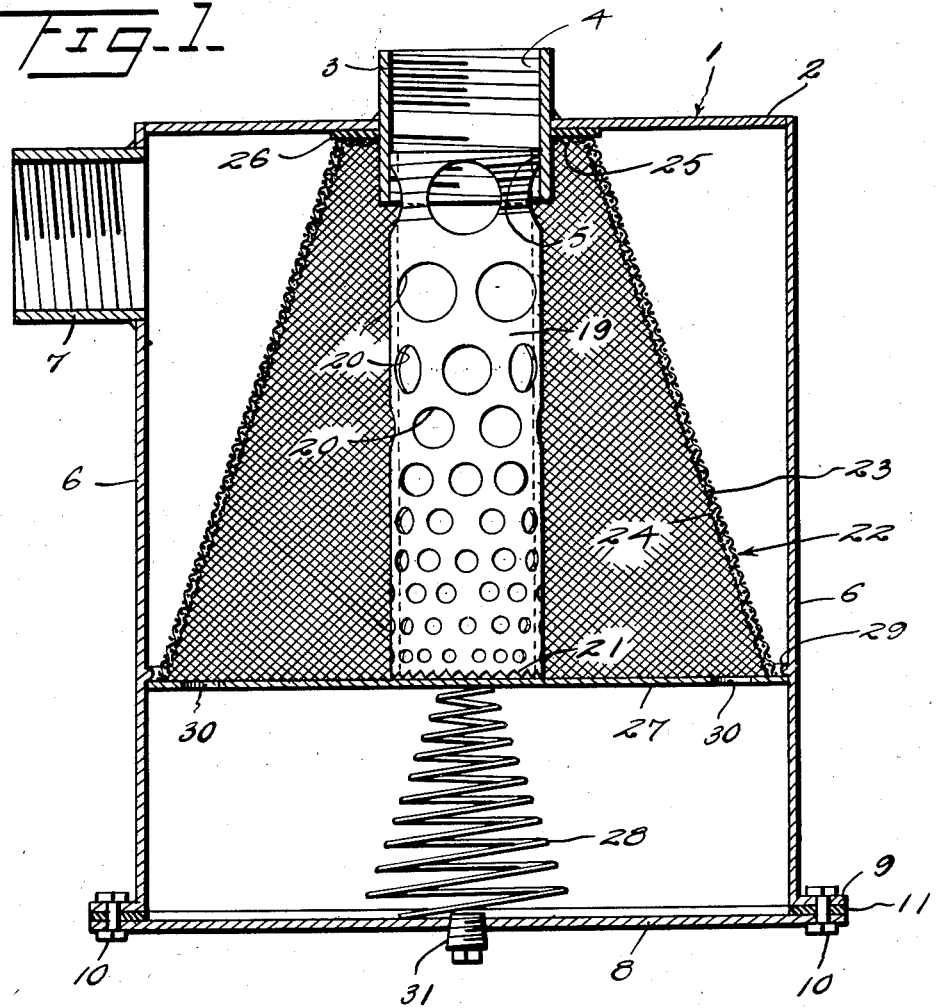
Figure 1 is a vertical section through the strainer embodying the present invention.

Referring to the drawing wherein like numerals of reference designate corresponding parts throughout the views, the numeral 1 indicates generally the housing for the strainer embodying the present invention, which may be made in any cross sectional form but is preferably cylindrical. The central part of the top wall 2 of this housing has the short pipe section 3 extending therethrough and secured thereto, this pipe section being partly outside and partly inside the housing and having interior threads 4 and 5, as illustrated.

The side wall 6 of the housing adjacent the top is provided with the threaded outlet pipe or nipple 7 to which a suitable carry-off pipe may be attached when the strainer is in use.

The lower wall or bottom of the housing is indicated by the numeral 8 and this is removably attached to the wall 6 in any suitable manner, there being illustrated certain preferred ways of maintaining this wall in position. In Figure 1, the side wall 6 of the housing is provided with the lateral surrounding flange 9 to which the bottom 8 is attached by bolts 10 which pass through the flange and the bottom as illustrated, a stop gasket 11 being interposed between these bodies to prevent leakage.

Figure 2:
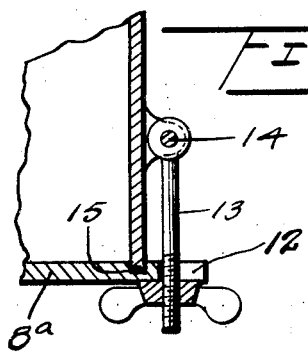
Figure 2 is a view showing a modified detail of construction.

In Figure 2, another method is illustrated for securing the receptacle bottom, the bottom here being indicated by the numeral 8ª and having a series of slots 12 cut in its periphery to receive the free end of a swinging eye bolt 13 which is pivotally attached to the wall of the receptacle as indicated at 14. With this construction the surface of the bottom 8ª may be grooved as indicated at 15 to receive the lower edge of the receptacle wall and any suitable means employed for maintaining a tight joint.

Figure 3:
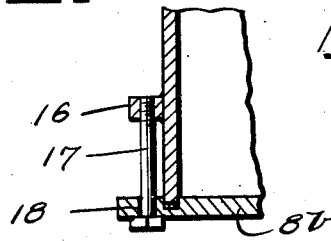
Figure 3 is a further modified detail of construction.

Figure 3 illustrates still another acceptable method of securing the receptacle bottom in position. The bottom is here indicated by the numeral 8ᵇ and as shown, nuts 16 are welded to the wall of the receptacle at intervals about its exterior or interior, as desired, to receive the threaded end of a bolt 17 which passes through a suitable aperture 18 in the bottom 8ᵇ.

Within the receptacle 6 is a perforated tube 19 which has one end threaded and engaged with the threads 5 in the inner end of the inlet pipe 3. The apertures 20 in this inlet pipe are relatively large at the inlet end where the pipe is attached to the pipe section 3 and gradually decreases in size toward the inner end as illustrated. In addition the inner end edge of the pipe 19 is provided with a series of notches or serrations 21. This notched edge of the pipe 20 terminates a substantial distance from the bottom 8 of the housing.

Surrounding the perforated pipe 19 is a frustro-conical strainer unit indicated generally by the numeral 22 and made up of a relatively heavy outer screen wire 23 and a light or fine mesh inner screen wire 24. While it is to be understood that the invention is not to be limited to any specific size of wire mesh for the strainer unit 22, it is preferred that a quarter inch mesh be employed for the outer half of the strainer unit and an eighty mesh screen form the inner half. At the upper end of the unit 22, the heavy mesh portion is formed to provide the inturned flange 25 which surrounds the pipe 19 and is pressed against the top 2 of the housing, being held from direct contact therewith by a suitable gasket 26. At its lower edge the strainer unit 22 is attached to the plate 27 which forms a partition wall in the housing and which abuts the serrated lower edge 21 of the tube 19, being maintained firmly in contact therewith by a helical spring 28 of suitable weight which is interposed between it and the bottom wall 8.

In order to maintain the plate 27 against bending or warping under the pressure of the spring 28 and the action of liquids flowing into the casing through the pipe 19, the wall 6 has attached thereto or formed integral therewith the annular rib 29 against the underside of which the edge of the disk 27 is pressed. This connection between the rib and the plate or disk forms a seal to prevent sediment working up between the bottom edge of the screen 23 and the side wall of the receptacle or housing, to the outside of the screen.

Within the area defined by the lower edge of the strainer unit 22 and adjacent this edge of the unit, the plate 27 which forms a partition wall in the casing is provided with an annular series of apertures 30 through which sediment may pass into the sediment chamber formed between the plate 27 and the bottom wall 8.

Any suitable means may be employed for facilitating the draining of the casing to remove sediment from the sediment chamber, without the necessity of removing the bottom wall, such as the drain plug 31.

From the foregoing it will be readily apparent that by the removal of the bottom wall 8, the entire strainer unit 22, which includes the wall 27, may be readily slipped out of the casing 1 so that the screens thereof may be cleaned or replaced as necessary.

It will also be apparent that with the construction herein disclosed liquid entering the casing will be discharged laterally through the openings 20 and between the wall 27 and the serrations 21 to pass directly to the outlet pipe 7 through the straining screens. In this manner, solid particles carried by the liquid will be at once removed by the screens and there will be no excessive disturbance or eddying set up in the liquid to interfere with its smooth passage through the casing.

As the device is being used, most of the liquid will pass through the large top holes of the tube 19 and flow directly outwardly striking the screen at the top. Sediment and water will contact the sloping screen and tend to move downwardly into the less turbulent contents rather than to adhere to the screen, where sedimentation will increase in efficiency as the contents of the receptacle become more quiet. Movement of the contents is always outward and quieter close to the plate 27 on account of the decreased size of the holes in the tube 19 and because of the increased distance from the outlet 7, and a very gentle outward flow will take place at the bottom serrations of the tube which will continually wash the top of the plate 27 clean and carry particles thereon toward the holes 30 through which they will drift into the lower chamber. The larger particles entering with the liquid will tend to pass the larger holes in the upper part of the tube and be trapped in the lower part where they will be held until removed, thus saving the screen from the destroying action of the large particles of matter. Certain of these larger particles may be of a character to be broken up by the agitation within the tube until they have reached a size which will permit them to pass through the small holes in the lower part of the tube and then pass through the holes 30 in the plate 27.

What is claimed is:—

1. A strainer, comprising a casing having a central inlet at its top and an outlet adjacent the top, an apertured pipe leading downwardly from said inlet to a point spaced from the bottom of the casing, an apertured plate dividing the casing transversely and abutting the inner end of said apertured pipe, a cone-shaped strainer unit interposed between the plate and the top of the casing and surrounding the apertured pipe, the base of said unit bearing on said plate and the top engaging the wall of the casing having the inlet therethrough, said casing bottom being removable and spring means carried by said bottom and engaging said plate to maintain the same and the strainer unit in operative position.

2. A strainer, comprising a casing having top, bottom and side walls, said top wall having an inlet, means removably securing the bottom wall in position, abutment means carried by the side wall of the casing in spaced relation with the bottom wall, an inlet tube connected at one end with said inlet and extending longitudinally in the casing, said tube being perforated throughout its length, an apertured plate disposed in spaced relation with the bottom wall and contacting said abutment, a frustro-conical strainer unit mounted in upright position upon said plate and surrounding said apertured tube and extending from the plate to the top wall of the casing, resilient means carried by the removable bottom wall and bearing against said apertured plate to force the same upwardly against the abutment and the inner end of the apertured tube, and outlet means leading from the casing adjacent the top thereof.

3. A strainer, comprising a casing having top, bottom and side walls, means removably securing the bottom wall in position, abutment means carried by the side wall of the casing in spaced relation with the bottom wall, an inlet pipe extending through the central part of the top wall and threaded adjacent each end, a tube threadably secured at one end to the inner end of the inlet pipe and extending longitudinally in the casing, said tube being perforated throughout its length, an apertured plate disposed in spaced relation with the bottom wall and contacting said abutment, a frustro-conical strainer unit mounted in upright position upon said plate and surrounding said apertured tube and extending from the plate to the top wall of the casing, resilient means carried by the removable bottom wall and bearing against said apertured plate to force the same upwardly against the abutment and the inner end of the apertured tube, and outlet means leading from the casing adjacent the top thereof, said strainer unit comprising a pair of nested screens, one of which is of relatively heavy and coarse construction.

4. A strainer, comprising a casing having top, bottom and side walls, means removably securing the bottom wall in position, abutment means carried by the side wall of the casing in spaced relation with the bottom wall, an inlet pipe extending through the central part of the top wall and threaded adjacent each end, a tube threadably secured at one end to the inner end of the inlet pipe and extending longitudinally in the casing, said tube being perforated throughout its length, an apertured plate disposed in spaced relation with the bottom wall and contacting said abutment, a frustro-conical strainer unit mounted in upright position upon said plate and surrounding said apertured tube and extending from the plate to the top wall of the casing, resilient means carried by the removable bottom wall and bearing against said apertured plate to force the same upwardly against the abutment and the inner end of the apertured tube, and outlet means leading from the casing adjacent the top thereof, said straining unit comprising a pair of nested screens and said apertured tube having its apertures of decreasing diameter from the attached end of the tube inwardly toward the plate and further having its inner end in contact with the apertured plate and serrated.

HOWARD D. PHILLIPS.